US006360820B1

(12) United States Patent
Laborde et al.

(10) Patent No.: US 6,360,820 B1
(45) Date of Patent: Mar. 26, 2002

(54) METHOD AND APPARATUS FOR COMMUNICATING WITH DOWNHOLE DEVICES IN A WELLBORE

(75) Inventors: Guy Vachon Laborde, Austin, TX (US); Sandeep Sharma, Jakarta (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/595,499

(22) Filed: Jun. 16, 2000

(51) Int. Cl.[7] .......................... E21B 43/00; E21B 47/12; G01V 23/28
(52) U.S. Cl. ................. 166/66; 166/250.01; 340/855.1; 340/854.8; 340/852.2
(58) Field of Search ........................... 164/250.01, 65.1, 164/66; 340/854.9, 853.7, 855.1, 855.2, 854.8, 852.2

(56) References Cited

U.S. PATENT DOCUMENTS

| | | | |
|---|---|---|---|
| 4,806,928 A | | 2/1989 | Veneruso |
| 5,455,573 A | * | 10/1995 | Delatorre ................. 340/854.8 |
| 5,457,988 A | | 10/1995 | Delatorre |
| 5,467,823 A | | 11/1995 | Babour et al. |
| 5,521,592 A | | 5/1996 | Veneruso |
| 5,597,042 A | * | 1/1997 | Tubel et al. ........... 166/250.01 |
| 5,803,167 A | * | 9/1998 | Bussear et al. ............ 166/65.1 |
| 5,829,520 A | | 11/1998 | Johnson |
| 5,941,307 A | | 8/1999 | Tubel |

OTHER PUBLICATIONS

Paulo Tubel and Mark Hopmann, Intelligent Completions Control Subsea Production, Journal of Petroleum Technology, Oct. 1996, 2pages, vol. 48, No. 10, Society of Petroleum Engineers, Richardson, TX 75080, U.S.A.

Technology Digest, Journal of Petroleum Technology, Oct. 1996, 3pages, vol. 48, No. 10, Society of Petroleum Engineers, Richardson, TX 75080, U.S.A.

* cited by examiner

Primary Examiner—David Bagnell
Assistant Examiner—Jennifer R. Dougherty
(74) Attorney, Agent, or Firm—Trop, Pruner & Hu P.C.

(57) ABSTRACT

A system for use in a well such as an intelligent completion system, includes an electrical cable and a plurality of communication modules positioned in the well. At least a first one of the communication modules is connected to the electrical cable. At least a second one of the communication modules is positioned in a remote location in the well past separately installed downhole equipment. A communications link mechanism that includes an inductive coupler mechanism provides communication between the first and second ones of the communication modules.

31 Claims, 4 Drawing Sheets

METHOD AND APPARATUS FOR COMMUNICATING WITH DOWNHOLE DEVICES IN A WELLBORE

BACKGROUND

The invention relates to methods and apparatus for communicating with downhole devices in a wellbore.

Oil and gas wells may be completed with a variety of downhole devices to produce hydrocarbons from, or inject fluids into, formations beneath the earth's surface. Completion equipment have been developed for many types of wells, including vertical or near-vertical, horizontal, highly deviated, and multilateral wells. Typical completion equipment include valves, tubing, packers, and other downhole devices for fluid flow control, as well as electrical devices such as sensors and control devices to monitor downhole conditions and/or to control actuation of completion devices (e.g., opening or shutting valves, setting packers, and so forth).

More recently, to provide for data acquisition and control of wells, intelligent completion systems (ICS) have been proposed or developed to enable a well surface operator to monitor and control the production of hydrocarbons from multiple zones in a single wellbore or from individual lateral wellbores in a multilateral well. An ICS is used to reduce the number of interventions needed during the life of the well since downhole conditions can be monitored and production can be controlled remotely. Typically, an ICS includes surface (or remote) control equipment and downhole modules that are in communication with the surface (or remote) control equipment. The ICS downhole modules may include sensors for measuring tubing and annulus pressure, temperature, and flow rates as well as control devices to actuate valves and other downhole devices.

In some ICS completion systems, a single electrical cable is run from the surface to connect to the downhole modules (sometimes referred to as an I-wire connection). Thus, control signals, as well as power, can be sent from the surface down the electrical cable to the downhole modules, and measurement data obtained by the downhole modules can be communicated up to surface through the same cable. However, there may be locations in a well that are difficult to access by an I-wire connection. One example is a sand face completion, in which screens or gravel packs are typically run in segments. As a result, wet connections may have to be made between the segments, which may be impractical and unreliable. Thus, a need arises for more practical and reliable techniques of deploying electrical devices in remote locations in a well, such as a sand face completion in a well.

SUMMARY

In general, according to one embodiment, an apparatus for use in a wellbore comprises an adapter capable of being attached to a carrier line to enable the apparatus to be run into the wellbore. The apparatus further includes an inductive coupler portion, a device for performing a task in the wellbore, and an electrical link between the inductive coupler portion and the device.

In general, according to another embodiment, a system for use in a wellbore comprises a communications module, a remote module in the wellbore, and equipment having a plurality of sections installed separately in the bore. The remote module is positioned past at least one of the sections. An inductive coupler link is between the remote module and the communications module.

Other features and embodiments will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

As used here, the terms "up" and "down"; "upper" and "lower"; "upwardly" and "downwardly"; and other like terms indicating relative positions above or below a given point or element are used in this description to more clearly describe some embodiments of the invention. However, when applied to equipment and methods for use in wells that are deviated or horizontal, such terms may indicate a left-to-right, right-to-left, or diagonal relationship as appropriate. Further, "proximal" refers to a shallower point of a wellbore while "distal" refers to a deeper point of the wellbore.

Figure 1:
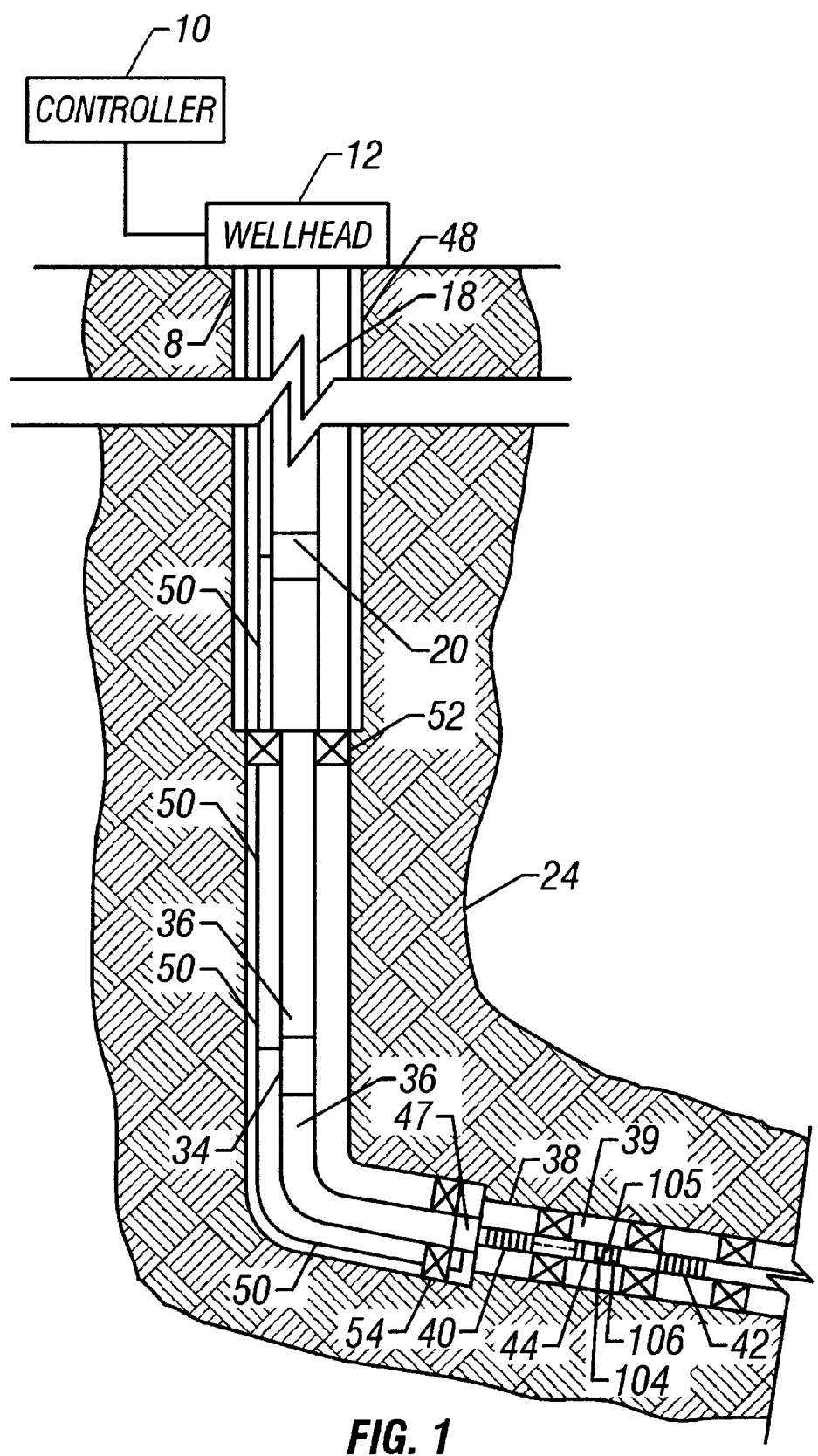
FIG. 1 illustrates an embodiment of completion equipment including various downhole modules positioned in a wellbore.

Referring to FIG. 1, an embodiment of completion equipment positioned in a wellbore 8 is illustrated. The wellbore 8 may have a deviated section 38. An upper section of the wellbore 8 is lined with casing 48, and a main production tubing 18 extends from wellhead equipment 12 at the surface into the wellbore 8. The main production tubing 18 connects to a pipe 46 that extends into a lower wellbore section.

In one embodiment, the completion equipment in the wellbore 8 may include an intelligent completion system (ICS) having downhole modules with sensors and control devices. Alternately, the completion equipment may include other types of systems, such as permanent monitoring systems (PMS) and other systems having downhole modules for monitoring well conditions or controlling well equipment. As illustrated, two downhole modules 20 and 34 in the ICS are attached to the main tubing 18 and the lower pipe 36, respectively. In further embodiments, a greater or lesser number of modules may be connected in the system. Such downhole modules may include various types of electronics, including control units (e.g., microprocessors, microcontrollers, and so forth), storage devices, electrically-activable actuation devices (which may be linked to valves), and/or sensor and monitoring devices.

The modules 20 and 34 may be electrically coupled to an electrical cable 50 (that may include one or more electrical conductors) extending from the surface. The electrical cable 50 communicates power and signals between or among the downhole modules 20 and 34 and a surface controller 10 coupled to the wellhead equipment 12. The surface controller 10 may be physically located at the well surface or at some distant location in communication (wired or wireless) with the wellhead equipment 12. The cable 50 may be routed through various downhole components, including packer 52, to the modules 20 and 34.

A module 44 including control and/or sensor devices may be positioned in the deviated wellbore section 38. In one example arrangement, the deviated wellbore section 38 may include gravel pack and screen assemblies 40 and 42 attached to a tubing 39 positioned inside the deviated wellbore section 38 as part of a sand face completion. Each gravel pack and screen assembly includes a gravel pack positioned between the outside of the screen and the inner wall of the deviated wellbore section 38. Fluids from the surrounding formation flow into the deviated wellbore section 38 and through the screen and gravel pack assemblies 40 and 42 into the lower pipe 36. As is typical, the sand face completion equipment including the gravel pack and screen assemblies 40 and 42 are assembled in sections in the deviated wellbore section 38 (or in any other location in the wellbore 8). A communications module, such as module 44, attached between the sections of the sand face completion equipment would have to make wet connections during assembly if an electrical wired connection is desired. However, in accordance with one embodiment, an inductive coupler system 47 is used through which the module 44 in the lower deviated wellbore section 38 may communicate with a main communications module (e.g., module 20 or 34 or the surface controller 10).

As used here, a "remote module," such as module 44, may be any communications module (control module or monitoring module) that is capable of communicating with another device (downhole or at the well surface) and that is attached below or past a separately installed downhole component, such as sand control equipment. The remote module is capable of performing a task, such as a monitoring task, a measurement task, or a control task. Due to the positioning of the remote module, a wet connection would be required if direct electrical contact is desired. This is typically the case where a completion string is installed in separate segments. One example involves modules placed in sand control assemblies that are installed in separate segments. Another example involves any other completion string where separate sections may be desirable. For example, where it is known that one part of a completion string will be pulled out of a wellbore more frequently than another part, such as for work-over operations, it may be desirable to install the completion string in separate segments. A submersible pump is an example of a part that may require more frequent repairs than other components.

Thus, as used here, a remote communications module is "separate" from another downhole equipment section if the remote communications module and downhole equipment are installed into the wellbore 8 separately. A remote module is said to be "past" the separate downhole equipment section if it is more distal from the wellbore surface than the separate downhole equipment section.

In the illustrated embodiment of FIG. 1, the module 44 may be powered by electrical power inductively coupled from a main module. Alternatively, the module 44 may be powered by a power supply 104 that includes a battery, for example. To extend the life of the battery in the power supply 104, a long-life battery may be used or a remote module 44 that has relatively low power consumption may be used. For example, one technique to reduce power consumption may be to keep the module 44 in a standby or off state when inactive. Another technique of reducing power consumption is to activate the remote module 44 only during set times, such as once a day or some other set period. Thus, for example, if the remote module 44 is a monitoring device, then the module 44 may be powered on at a predetermined time to take a measurement. The module 44 then communicates the measured data to the main module 20 or 34 or the surface controller 10. After the measurement data has been communicated, the remote module 44 may be powered back down to either the standby or off state. If the remote module 44 includes control devices, such control devices may be powered up from an off state or a standby state in response to receipt of a command.

In a further embodiment, a mini-turbine 106 may also be located in the proximity of the remote module 44. The mini-turbine 106 is attached to a trickle charger 105 that may be used to charge the battery 104. The mini-turbine 106 may be mounted in a pocket and is activated by fluid flow in the deviated wellbore section 38. When activated, the mini-turbine 106 generates power to re-charge the battery 104.

To communicate with the module 44, the inductive coupler system 47 is used. The inductive coupler system 47 is connected to the main cable 50. Examples of inductive coupler systems include those described in U.S. Pat. No. 4,806,928, entitled "Apparatus for Electromagnetically Coupling Power and Data Signals Between Wellbore Apparatus and the Surface," by Anthony F. Veneruso, which is hereby incorporated by reference.

Figures 2, 3:
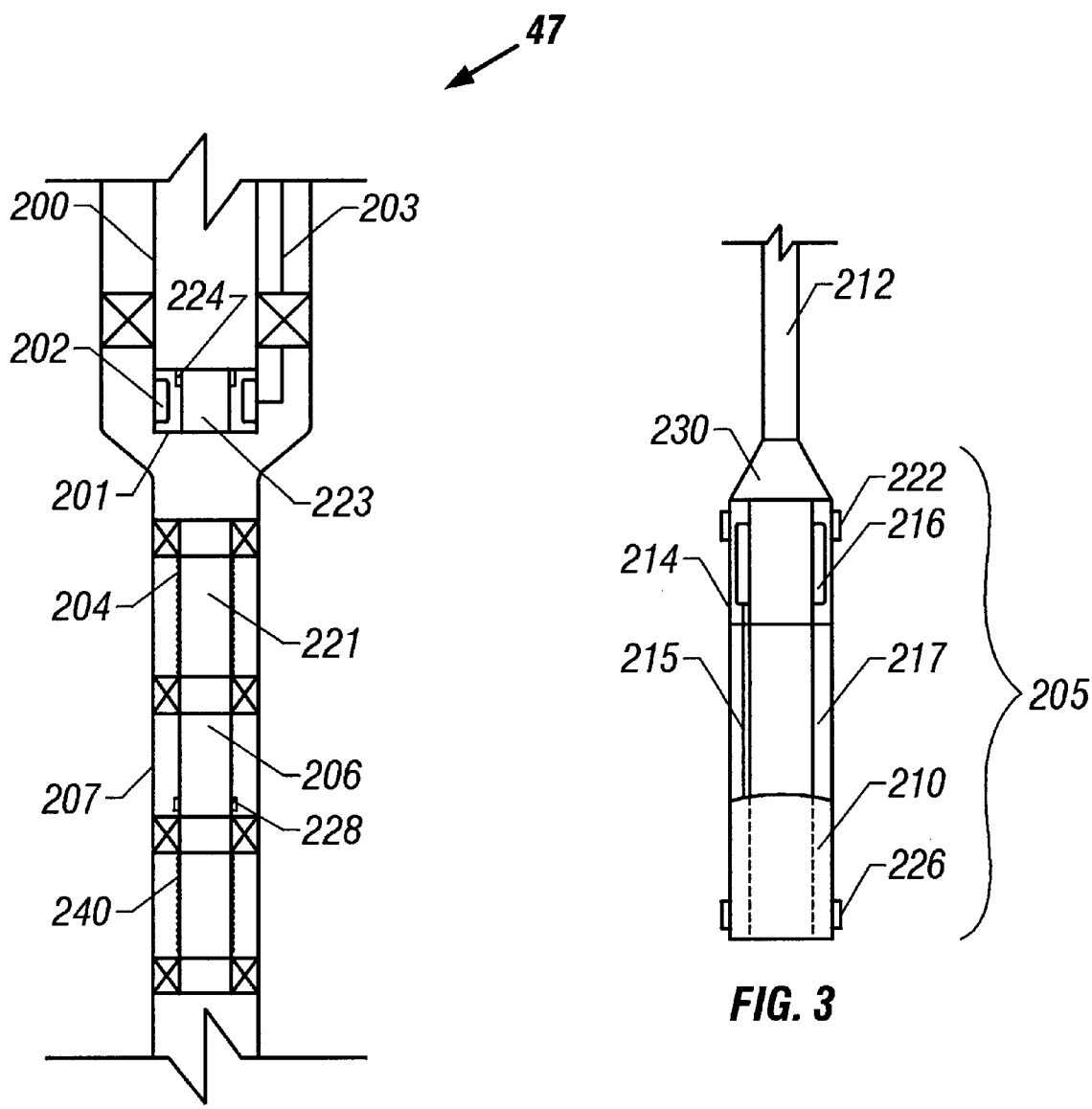
FIG. 2 illustrates a downhole module in accordance with an alternative embodiment that includes a first inductive coupler portion for communicating power and signals.
FIG. 3 illustrates a carrier device for carrying a second inductive coupler portion in accordance with the alternative embodiment for mating with the first inductive coupler portion of FIG. 2.

One embodiment of an inductive coupler system includes a male coil element and female coil element, in which the female coil element is positioned downhole and the male coil element is lowered into close proximity with the female coil element so that an electrical current generated in one of the coil elements is inductively coupled to the other coil element. Referring to FIGS. 2 and 3, the inductive coupler system 47 according to the one embodiment includes a female coil element 202 attached to the lower end of a tubing 200 (FIG. 2), which may be the pipe 36 (FIG. 1), and a male coil element 216 attached in a connector housing 214 (FIG. 3). The connector housing 214 and a sensor or control module 210 (which may be the remote module 44 in FIG. 1) is part of a remote module assembly 205 that may be carried into the well by a carrier line 212 (which may be wireline, slickline, or coiled tubing).

In one embodiment, the tubing 200 extends to a region above an upper sand face completion section 204, which may be located in a vertical wellbore section, a horizontal wellbore section, or a deviated wellbore section. Additional sand face completion sections may be present in the wellbore, such as a lower sand face completion section 240. It may be desirable to position a sensor or control module between the sand face completion sections 204 and 240 (which may correspond to sections 40 and 42 in FIG. 1), generally in a region indicated as 206 in FIG. 2. One possibility is to install such a module in the region 206 after the lower sand face completion section has been assembled but before the upper sand face completion section 204 is installed. However, to make a wired electrical connection to such a module in the region 206 (a remote location) would require use of a wet connection between a wire routed through the upper sand face completion section 204 and the remote module. In accordance with an embodiment of the invention, to avoid employing wet connections, an inductive coupler connection is employed to enable communication between a remote module placed in the region 206 and one of the main modules further up the wellbore or at the well surface over an electrical cable 203 (which may correspond to cable 50 in FIG. 1).

The remote module assembly 205 carrying the remote module 210 to be deployed in the region 206 may be lowered through a bore 223 of the female coil element housing 201 and a bore 221 of the sand face assembly 204 so that the remote module 210 may be engaged in a receiving housing 207. The connector housing 214 in the remote module assembly 205 may have a locking mechanism 222 (e.g., locking dogs) to engage a corresponding profile 224 in the female coil element housing 201. A locking mechanism 226 may also be formed on the external surface of the remote module 210 to engage a mating profile 228 in the receiving housing 207. In the remote module assembly 205, one or more electrical conductors 215 may extend through a middle housing section 217 (or outside of the middle housing section 217) to provide an electrical link between the male coil element 216 and the remote module 210.

In operation, once the remote module assembly 205 is locked in place, a releasable adapter 230 coupling the carrier line 212 to the remote module assembly 205 may be released to remove the carrier line 212 from the wellbore, leaving behind the remote module 210 and male coil element 216. The male coil element 216 is at a first depth (at a proximal end of the sand control equipment) while the remote module 210 is at a second depth (past at least one of the sections of the sand control equipment). Power is provided down the electrical cable 203 to the female coil element 202. Once the male coil element 216 is in engaging proximity with the female coil element 202, the power may be inductively coupled from the female coil element 202 to the male coil element 216, which transfers the power down the electrical conductor(s) 215 to the remote module 210. If the remote module 210 is a sensor module, then measurement data gathered by the remote module may be communicated as electrical signals over the conductor(s) 215 to the male coil element 216. The male coil element 216 in turn couples the communicated signals to the female coil element 202 for transmission up the electrical cable 203.

By using an inductive coupler mechanism to provide a communications path to a remote module, a wet wired connection can be avoided. An added advantage of using an inductive coupler mechanism in accordance with one embodiment is that a separate power supply may not be needed in the remote module, which reduces cost of deploying modules at remote locations as well as reduces the size of such remote modules.

Figure 4:
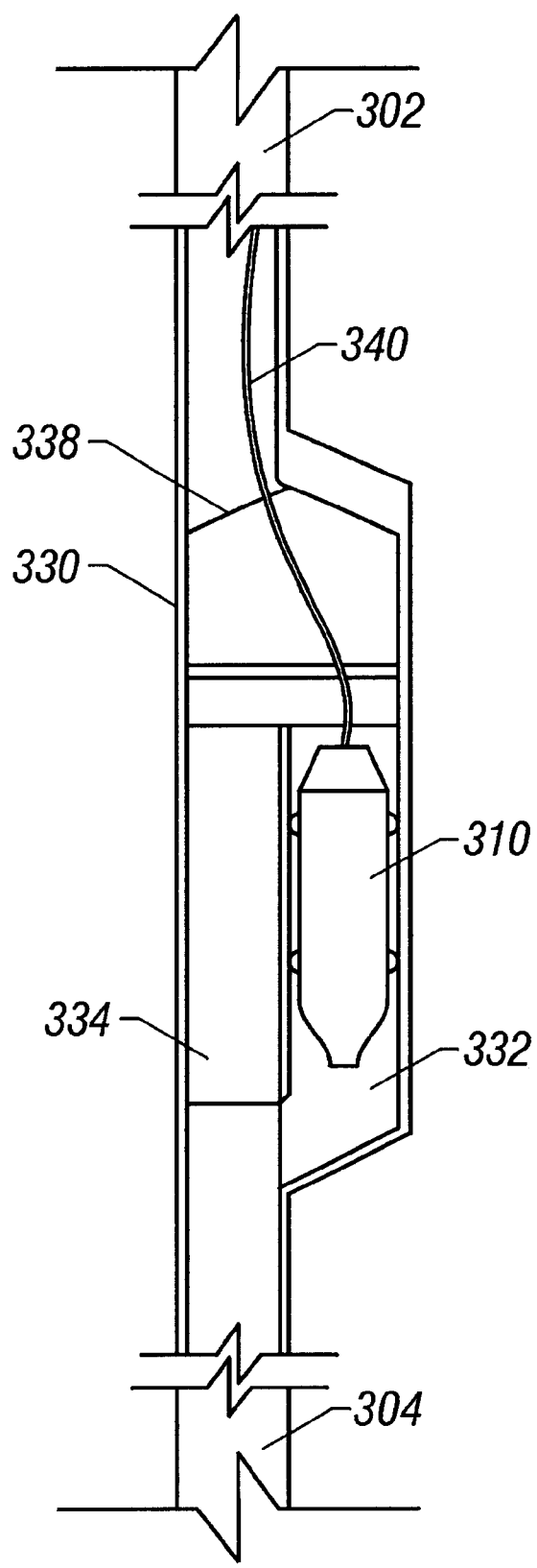
FIG. 4 illustrates a side pocket mandrel adapted to receive a downhole module in accordance with one embodiment.

Referring to FIG. 4, another technique of positioning a remote module 210 in a remote location, such as region similar to region 206 in FIG. 2, is by use of a side pocket mandrel 330 attached between upper and lower sand face completion sections 302 and 304. The side pocket mandrel 330 includes a main passageway 334 as well as a side passageway 332. The side passageway 332 may be adapted to receive a remote module 310 (corresponding to remote module 44 in FIG. 1). The side pocket mandrel 330 includes an orienter mechanism 338 to direct the remote module 310 into the side passageway 332. A wire 340 connected to the remote module extends upwardly past the upper sand face completion section 302 to an inductive coupler mechanism similar to that disclosed in FIGS. 2 and 3.

The inductive coupler mechanism according to further embodiments may also be used to deploy remote sensor or control modules in other remote locations in the wellbore 8. Such locations may include any other location in which completion equipment is assembled in different stages or segments which would require use of wet connections if wired connections are desired.

Figure 5:
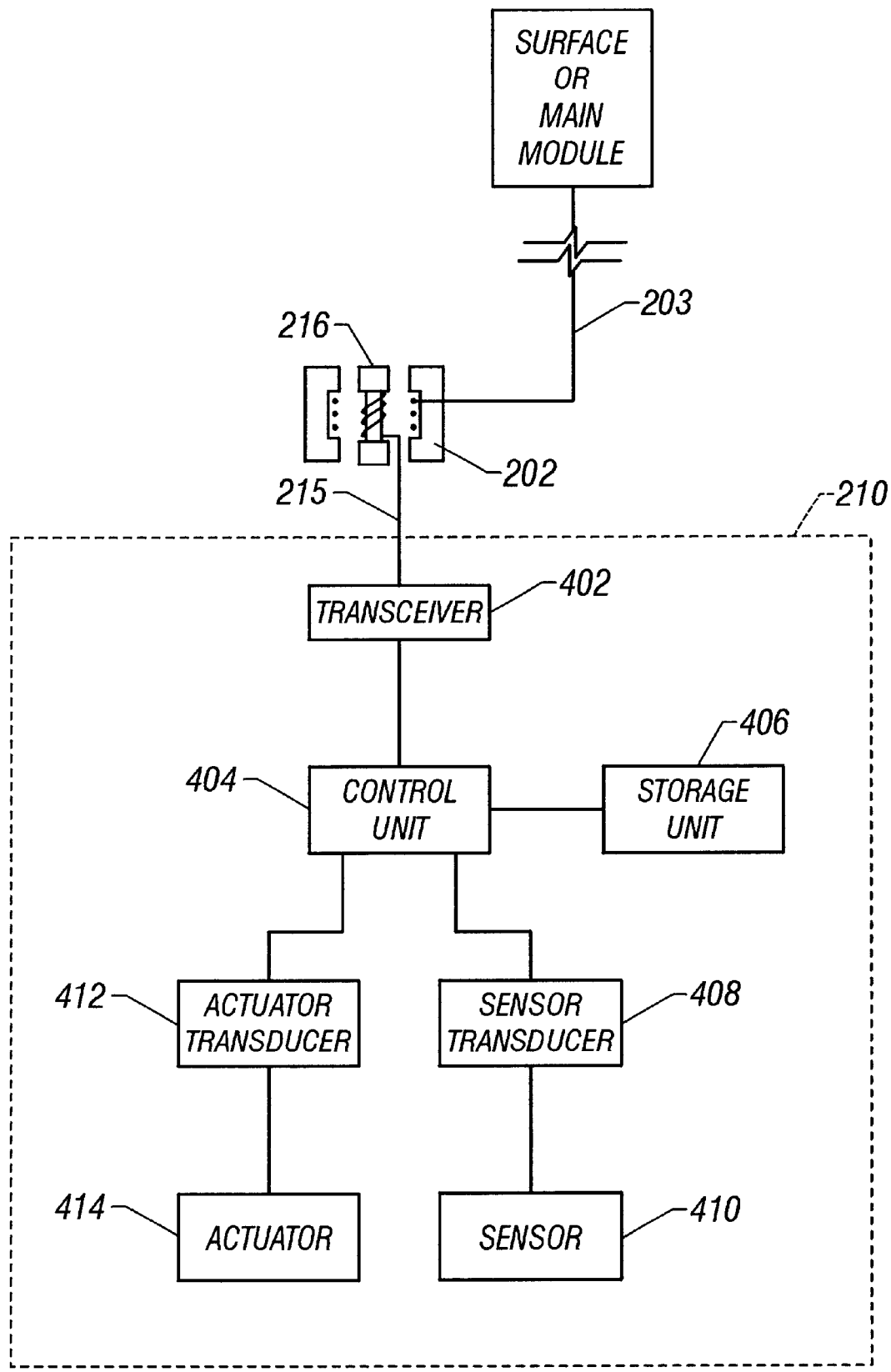
FIG. 5 is a block diagram of an inductive coupler communications mechanism including the first and second inductive coupler portions of FIGS. 2 and 3 and components in the downhole module of FIG. 4.

Referring to FIG. 5, a portion of the inductive coupler communications mechanism is illustrated. The female coil element 202 is coupled by the electrical cable 203 to at least one of the main modules and surface controller 10. The male coil element 216 is coupled by an electrical wire 215 to a transceiver 402 in the remote module 210. The transceiver 402 is coupled to a control unit 404, which may be a microprocessor, microcontroller, or other control device. The control unit 404 is also coupled to a storage unit 406 for storing data and instructions. The control unit 404 can receive data from a sensor transducer 408, which receives measured signals from a sensor 410. The control unit 404 may also provide activating commands to an actuator transducer 412 that translates the commands into signals for activating an actuator 414 (e.g., a valve actuator or other actuator). Power communicated down the electrical cable 203 is inductively coupled between the female coil and male coil elements 202 and 216, with the power transferred over the electrical wire 215 to the remote module 210.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. Apparatus for use in a wellbore, comprising:
   an adapter capable of being attached to a carrier line to enable the apparatus to be run into the wellbore;
   a first inductive coupler portion having a first coil element;
   a device for performing a task in the wellbore; and
   an electrical link between the first inductive coupler portion and the device,
   wherein the first coil element is adapted to be positioned in the proximity of a second coil element of a downhole inductive coupler portion to enable the first inductive coupler portion to communicate with the downhole inductive coupler portion.

2. The apparatus of claim 1, further comprising a housing and a locking mechanism engageable with a profile in downhole equipment.

3. The apparatus of claim 1, having a length to enable the first inductive coupler portion to be at a first depth and the device to be at a second depth in the proximity of a location in which the device is to perform the task.

4. The apparatus of claim 3, wherein the device comprises a monitoring device.

5. The apparatus of claim 1, wherein the device comprises a monitoring device.

6. A system for use in a wellbore, comprising:
   a first inductive coupler portion having a first coil element;
   an electrical cable connected to the first inductive coupler portion; and
   a tool capable of being run into the wellbore, the tool comprising:
   a second inductive coupler portion having a second coil element, the second coil element adapted to be positioned in the proximity of the first coil element to communicate with the first inductive coupler portion;

a device for performing a task in the wellbore; and an electrical link between the second inductive coupler portion and the device.

7. The system of claim 6, further comprising a tubing, the first inductive coupler portion attached to the tubing.

8. The system of claim 6, further comprising a communications module connected to the electrical cable.

9. The system of claim 8, wherein the communications module comprises a surface controller.

10. The system of claim 8, wherein the communications module comprises a node of an intelligent completions system.

11. A system for use in a wellbore, comprising:

a first inductive coupler portion;

an electrical cable connected to the first inductive coupler portion; and a tool capable of being run into the wellbore, the tool comprising:
  a second inductive coupler portion adapted to communicate with the first inductive coupler portion;
  a device for performing a task in the wellbore; and
  an electrical link between the inductive coupler portion and the device; and sand control equipment having a plurality of sections, the first inductive coupler portion positioned at a proximal end of the sand control equipment, wherein the tool has a length to enable the second inductive coupler portion to be positioned in the proximity of the first inductive coupler portion and the device to be positioned between two sections of the sand control equipment.

12. The system of claim 11, further comprising a side pocket mandrel having a side pocket in which the tool may be positioned.

13. The system of claim 11, further comprising an engagement member located between the two sections of the sand control equipment, the tool adapted to be engaged to the engagement member.

14. A system for use in a bore of a well, comprising:

a communications module;

a remote module in the wellbore;

equipment having a plurality of sections installed separately in the bore, the remote module positioned past at least one of the sections; and an inductive coupler link between the remote module and the communications module.

15. The system of claim 14, wherein the sections of the equipment comprise separately installed sand control equipment sections.

16. The system of claim 14, wherein the inductive coupler link comprises a first coil element positioned in the wellbore and a second coil element that is run into the wellbore to engage the first coil element.

17. The system of claim 16, further comprising a tool comprising the second coil element and the remote module, the tool adapted to be run into the wellbore to position the remote module past at least one of the sections.

18. The system of claim 14, wherein the remote module comprises a monitoring device.

19. The system of claim 14, wherein the remote module comprises a control device.

20. The system of claim 14, wherein the communications module comprises a downhole module positioned in the wellbore.

21. The system of claim 14, wherein the communications module comprises a surface controller.

22. The system of claim 14, wherein the communications module is part of an intelligent completions system.

23. The system of claim 14, further comprising an electrical cable connected to the communications module.

24. The system of claim 14, further comprising a battery to provide power to the remote module.

25. The system of claim 24, further comprising a turbine activable by fluid flow to provide power to charge the battery.

26. A method of performing a task in a wellbore, comprising:

lowering a tool comprising a first inductive coupler portion and a device into the wellbore, the first inductive coupler portion having a first coil element;

positioning the first coil element at a first depth and the device at a second depth, the first coil element positioned in the proximity of a second coil element of a second inductive coupler portion located near the first depth; and activating the device to perform the task.

27. The method of claim 26, wherein activating the device comprises activating a monitoring device.

28. The method of claim 26, further comprising communicating power from the second inductive coupler portion to the first inductive coupler portion.

29. The method of claim 28, further comprising communicating signaling between the first an second inductive coupler portions.

30. A method of performing a task in a wellbore, comprising:

lowering a tool comprising an inductive coupler portion and a device into the wellbore;

positioning the inductive coupler portion at a first depth and the device at a second depth; and activating the device to perform the task, wherein positioning the device at the second depth comprises positioning the device past at least one section of sand control equipment having plural sections.

31. The method of claim 30, wherein positioning the inductive coupler portion comprises positioning the inductive coupler portion above the sand control equipment and in the proximity of a downhole inductive coupler portion.

* * * * *